(12) United States Patent
Mariman et al.

(10) Patent No.: US 6,647,904 B1
(45) Date of Patent: Nov. 18, 2003

(54) LOCKUP ASSEMBLY FOR A PLANTING UNIT

(75) Inventors: Nathan Albert Mariman, Geneseo, IL (US); Randall William Stoehr, Rock Island, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/218,646

(22) Filed: Aug. 14, 2002

(51) Int. Cl.$^7$ ............................................... A01B 63/26
(52) U.S. Cl. ...................... 111/62; 172/624.5; 172/662; 172/674; 403/92
(58) Field of Search ............................... 111/62, 59, 53, 111/52; 172/624.5, 662, 674, 269, 311, 466, 481, 484, 624, 683; 280/474; 403/92, 93

(56) References Cited

U.S. PATENT DOCUMENTS 4,738,317 A    4/1988   Bedney ...................... 172/624

OTHER PUBLICATIONS

Deere & Company Operator's Manual, 7340 Narrow–Row MaxEmerge 2 Integral Planters, Cover page, pp. 60–11 through 60–13, received in Patent Department Dec. 21, 1987.

Deere & Company, "Parts Catalog 2536", p. 68, date unknown.

*Primary Examiner*—Christopher J. Novosad

(57) ABSTRACT

A planting unit lockup assembly extends between upper and lower links of a parallelogram linkage. A lockup link is pivotally coupled to the upper link and extends downwardly to the lower link. The lockup link is also provided with a slot having a hook. A slide member is mounted to the lower link and engages the slot. A control link is pivotally coupled to the lockup link by a loose pivot coupling. The control link is biased towards the lower link by a spring. The control link is provided with a trapping element that engages the lockup link. The trapping element of the control link engages the lockup link in one of two positions, a normal position and a lockup position. In its normal position, the control link biases the hook away from the slide bushing member. In its lockup position, the control link biases the hook toward the slide bushing member.

20 Claims, 3 Drawing Sheets

LOCKUP ASSEMBLY FOR A PLANTING UNIT

FIELD OF THE INVENTION

The present invention is directed to a lockup assembly for a planting unit having a lockup link and a control link, wherein the control link has a normal position and a lockup position for engaging the lockup link.

BACKGROUND OF THE INVENTION

Planting units are typically coupled to a toolbar by parallelogram linkages so that the planting units can move vertically a limited amount relative to the toolbar. Sometimes a farmer wishes to deactivate or lockup one or more planting units. For example, a farmer with planting units on fifteen-inch rows for soybeans may want to switch to thirty-inch rows for corn. The farmer would lockup every other planting unit to plant the corn.

Lockup units are well known in the art. One example is disclosed in U.S. Pat. No. 4,738,317.

SUMMARY OF THE INVENTION

It is an object of the present invention to provide a planting unit lockup assembly that is compact and easy to operator.

The planting unit lockup assembly extends between upper and lower links of a parallelogram linkage. The lockup assembly comprises a lockup link and a control link. The lockup link is pivotally coupled to the upper link and extends downwardly to the lower link. The lockup link is also provided with a slot having a hook. A slide bushing member is mounted to the lower link and engages the slot. The control link is pivotally coupled to the lockup link by a loose pivot coupling. The control link is biased towards the lower link by a spring extending from the control link to the lower link. The control link is provided with a trapping element that engages the lockup link. The trapping element of the control link engages the lockup link in one of two positions, a normal position and a lockup position. In the normal position, the trapping element engages an aperture located in the lockup link. In its lockup position, the trapping element engages the side edge of the lockup link. In its normal position, the control link through the trapping element biases the hook away from the slide bushing member. In its lockup position the control link through the trapping element biases the hook towards the slide bushing member. The control link is provided with a handle for switching the control link between the two positions.

The control link is located between the left and right parallelogram linkages. Only the handle extends outwardly from the parallelogram linkages. This reduces the width requirements for the lockup assembly.

DETAILED DESCRIPTION

Figure 1:
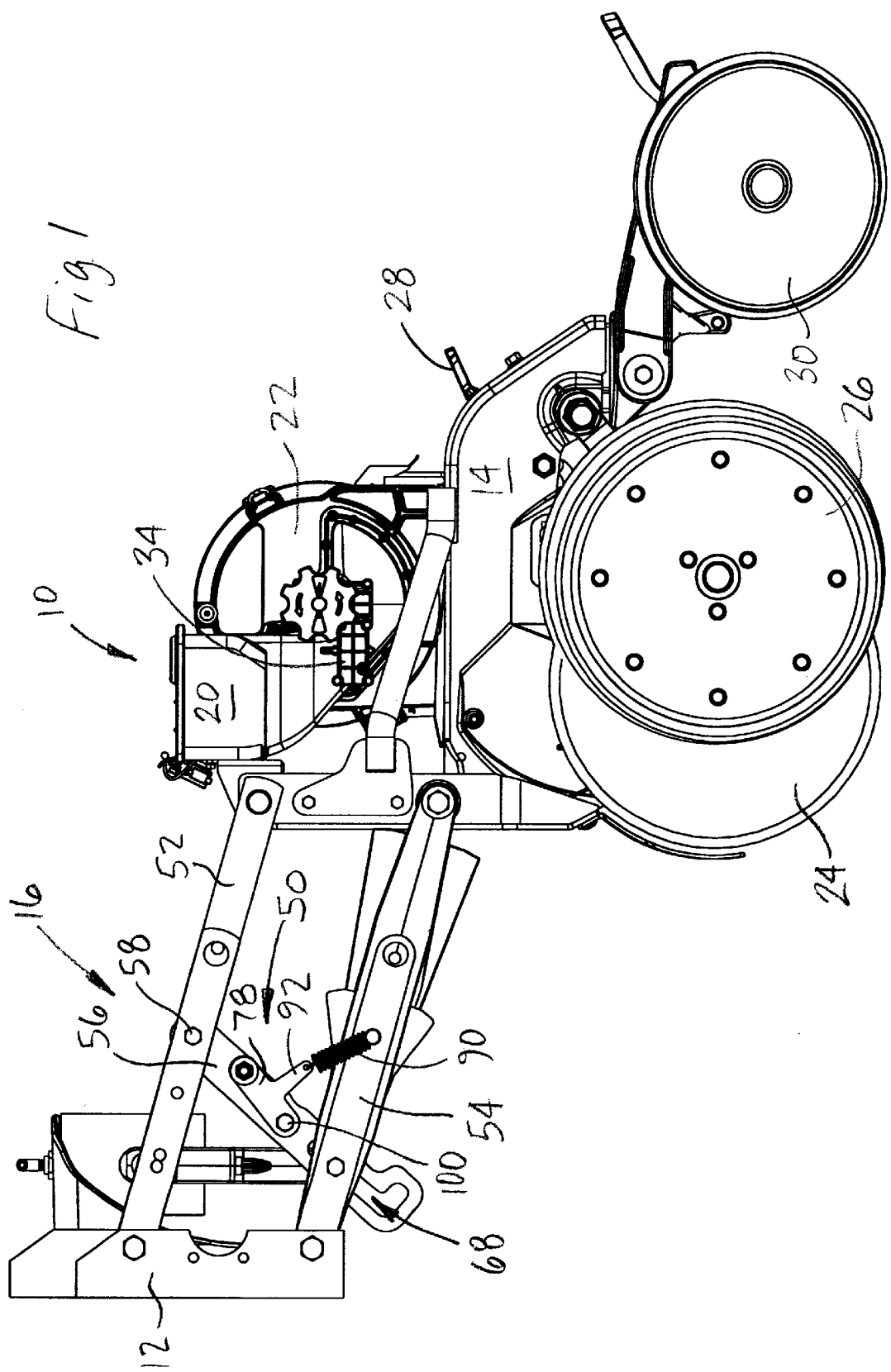
FIG. 1 is a side view of the planting unit it in its normal position.

The seeding machine 10 comprises an individual row crop planting unit that is mounted to a transverse toolbar, not shown, by U-bolts that engage a mounting plate 12. The planting unit is provided with a frame 14 that is coupled to the mounting plate 12 by a parallel linkage 16. The parallel linkage 16 allows the planting unit to move up and down to a limited degree relative to the toolbar. Seed is automatically directed to the planter by a pneumatic seed on demand delivery system. The seed on demand delivery system directs the seed pneumatically from a main hopper, not shown, through a seed hose to an auxiliary hopper 20 mounted on fame 14. Seed in the auxiliary hopper 20 is metered by a pneumatic pressure-seed meter 22 and directed to a planting furrow by a seed tube, not shown.

The planting furrow is formed by a double disc furrow opener 24 having depth gauging wheels 26. The depth of the planting furrow is controlled by the positioning of handle 28 which controls the vertical position of the depth gauging wheels 26 relative to the furrow opener 24. The planting furrow with metered seed deposited therein by the seed tube is closed by closing wheels 30.

The seed meter 22 is driven by a flexible rotatable drive shaft, not shown, that drives gear box 34. The flexible and rotatable drive shaft is of a type manufactured and marketed by Elliott Manufacturing Company, LLC of Binghamton, N.Y. A ground driven transmission, not shown, provides a rotational input into the flexible drive shaft. In this way the ground speed of the seeding machine 10 controls the speed of the seed meter 22.

Sometimes a farmer will want to lock one or more planting units into a raised non-use position. To that end a planting unit lock assembly 50 is mounted to the parallel links 16. The parallel links 16 have an upper link 52 and a lower link 54. A lockup link 56 extends between the upper and lower links 52 and 54. The lockup link 56 is pivoted on main pivot 58. The lockup link 56 is provided with a main pivot aperture which is aligned with aperture 60 in upper link 52. A bushing 62 is located in the main pivot aperture and is secured thereto by main pivot bolt 64, washer 65 and nut 66. The lockup link 56 is provided with a J-slot 68 having a hook 70. A slide bushing 72 rides in the slot 68. The slide bushing is secured thereto by slide bolt 74, washer 75 and nut 76.

A control link 78 is pivotally mounted to the lockup link 56 by pivot bushings 80 that are mounted to the lockup link 56 by carriage bolt 82, washer 83 and nut 84. The carriage bolt 82 is received in square aperture 86 on the lockup link 56. The pivot bushings 80 are received into an oblong loose aperture 88. The looseness of this aperture 88 relative to the pivot bushings 80 allows the control link 78 to be pivoted away from the lockup link 56 as will be discussed in more detail later. The control link 78 is biased by spring 90 towards the lower link 54. The spring 90 being hooked onto the arm 92 of the control link 78 and being anchored to the lower link 54 by pin 94, washer 95 and cotter pin 96.

The control link 78 is also provided with a combined handle and engagement element 100. The handle portion of the element 100 is formed by mounting bolt 102 and spacer 104. The mounting bolt 102 passes through the control link 78, bushing 106 and engages trapping nut 108. The trapping nut 108 is provided with an outwardly extending trapping lip 110. The mounting bolt 102, bushing 106 and trapping nut 108 forming the engagement portion of element 100.

The control link 78 as dictated by element 100 has two positions. A normal position illustrated in FIG. 1 and a lockup position illustrated in FIG. 2. In its normal position, the trapping nut 108 of element 100 is located in enlarged aperture 112. In its normal position, when the planting unit is raised, the spring 90 biases the control link 78 counterclockwise. Therefore the engagement portion of the element 100 pulls lockup link 56 counterclockwise so that the slide bushing 72 bears against the edge of the slot 68 away from the hook 70.

Figure 2:
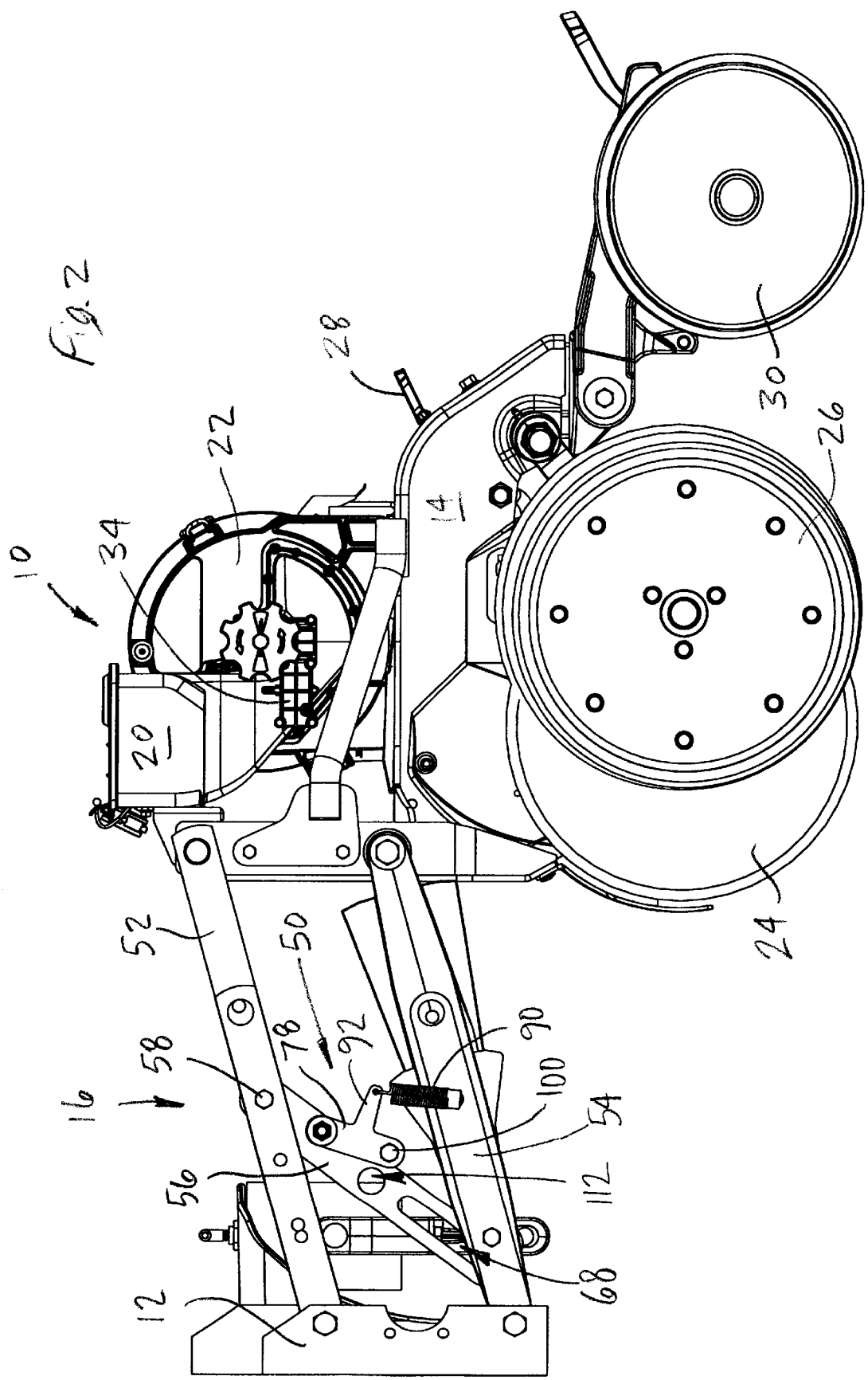
FIG. 2 is a side view of the planting unit in its lockup position.
Figure 3:
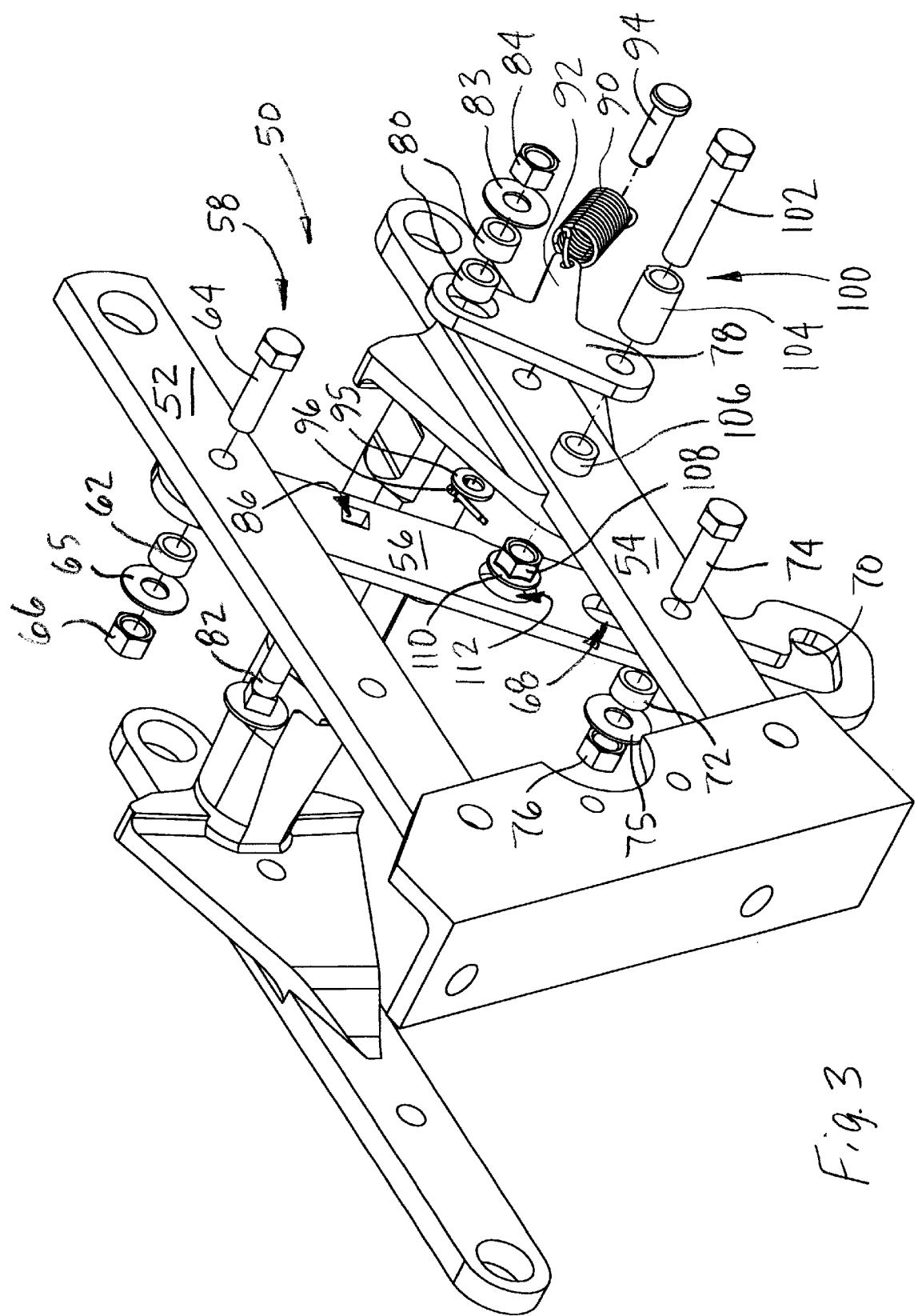
FIG. 3 is an exploded view of the lockup assembly.

In its lockup position the farmer grabs the handle portion of the element 100 an pulls the control link 78 away from the lockup link so that the trapping nut 108 is removed from enlarged aperture 112. The trapping nut 108 is then placed behind the lockup link as illustrated in FIG. 2. In this lockup position, when the planting unit is raised, the spring 90 biases the control link 78 clockwise. Therefore the engagement portion of the element 100 pushes lockup link 56 clockwise so that the slide bushing 72 bears against the edge of the slot 68 towards the hook 70. When the planting unit reaches its lockup position, the slide bushing 62 engages the hook 70 trapping the planting unit in the lockup position.

Having described the preferred embodiment, it will become apparent that various modifications can be made without departing from the scope of the invention as defined in the accompanying claims.

What is claimed is:

1. A planting unit lockup assembly for a planting unit having a parallelogram linkage being provided with an upper link and a lower link, the lockup assembly comprising:
   a lockup link extending between the upper link and the lower link, the lockup link being pivotally mounted to the upper link by an upper pivot, the lockup link having a hook;
   the lower link having a member that bears against the lockup link;
   a control link is pivotally coupled to the lockup link between the upper pivot and the hook, the control link being biased towards the lower link by a spring, the control link having two positions for engaging the lockup link, a normal position whereby the control link biases the hook of the lockup link away from the member and a lockup position whereby the control link biases the hook of the lockup link towards the member.

2. The planting unit lockup assembly as defined by claim 1 wherein the lockup link is provided with a slot in which the member is inserted, the slot defining the hook.

3. The planting unit lockup assembly as defined by claim 2 wherein the control link is provided with a trapping element that engages the lockup link.

4. The planting unit lockup assembly as defined by claim 3 wherein the lockup link is provided with an aperture into which the trapping element is inserted when the control link is in the normal position.

5. The planting unit lockup assembly as defined by claim 4 wherein the control link is loosely pivotally coupled to the lockup link.

6. The planting unit lockup assembly as defined by claim 5 wherein the control link is provided with an oblong aperture into which is inserted a cylindrical bushing that is mounted to the lockup link, the cylindrical bushing pivotally coupling the control link to the lockup link.

7. The planting unit lockup assembly as defined by claim 5 wherein the member is a sliding bushing located in the slot, the sliding bushing being mounted on the lower link.

8. The planting unit lockup assembly as defined by claim 5 wherein the trapping element is provided with a trapping lip.

9. The planting unit lockup assembly as defined by claim 8 comprising a nut that is mounted to a mounting bolt passing through the control link.

10. The planting unit lockup assembly as defined by claim 9 wherein the mounting bolt is provided with a spacer to define a handle for the control link.

11. The planting unit lockup assembly as defined by claim 5 wherein the control link is provided with a handle.

12. A planting unit lockup assembly, for a planting unit having a parallelogram linkage having right and left parallelogram linkages, one of the parallelogram linkages being provided with an upper link and a lower link, the lockup assembly comprising:
   a lockup link extending between the upper link and the lower link, the lockup link being pivotally mounted to the upper link, the lockup link having a hook, the lockup link being located between the right and left parallelogram linkages;
   the lower link having a member that bears against the lockup link;
   a control link is pivotally coupled to the lockup link, the control link having two positions for engaging the lockup link, a normal position whereby the control link biases the hook of the lockup link away from the member and a lockup position whereby the control link biases the hook of the lockup link towards the member.

13. The planting unit lockup assembly as defined by claim 12 wherein the lockup link is provided with a J-shaped slot in which the member is inserted, the J-shaped slot defining the hook.

14. The planting unit lockup assembly as defined by claim 13 wherein the control link is provided with a trapping element that engages the lockup link.

15. The planting unit lockup assembly as defined by claim 14 wherein the lockup link is provided with an aperture into which the trapping element is inserted when the control link is in its normal position.

16. The planting unit lockup assembly as defined by claim 15 wherein the control link is loosely pivotally coupled to the lockup link.

17. The planting unit lockup assembly as defined by claim 16 wherein the control link is provided with an oblong aperture into which is inserted a cylindrical bushing that is mounted to the lockup link, the cylindrical bushing pivotally coupling the control link to the lockup link.

18. The planting unit lockup assembly as defined by claim 16 wherein the member is a sliding bushing located in the slot, the sliding bushing being mounted on the lower link.

19. The planting unit lockup assembly as defined by claim 16 wherein the trapping element is provided with a trapping lip.

20. The planting unit lockup assembly as defined by claim 16 wherein the control link is provided with a handle that extends outwardly from the parallelogram linkages.

* * * * *